(12) United States Patent
Nishii

(10) Patent No.: US 6,805,654 B2
(45) Date of Patent: Oct. 19, 2004

(54) TOROIDAL-TYPE CONTINUOUSLY VARIABLE TRANSMISSION

(75) Inventor: Hiroki Nishii, Kanagawa (JP)

(73) Assignee: NSK Ltd., Tokyo (JP)

( * ) Notice: Subject to any disclaimer, the term of this patent is extended or adjusted under 35 U.S.C. 154(b) by 62 days.

(21) Appl. No.: 10/193,995

(22) Filed: Jul. 15, 2002

(65) Prior Publication Data

US 2003/0017907 A1 Jan. 23, 2003

(30) Foreign Application Priority Data

Jul. 19, 2001 (JP) .................................... P2001-219545

(51) Int. Cl.⁷ .............................................. F16H 15/38
(52) U.S. Cl. .............................. 476/40; 476/8; 476/42
(58) Field of Search .......................... 476/40, 42, 46, 476/8

(56) References Cited

U.S. PATENT DOCUMENTS 3,203,201 A * 8/1965 Harbke ........................ 464/16
3,947,075 A * 3/1976 Ewertz ........................ 384/210
6,206,801 B1 * 3/2001 Ishikawa et al. .............. 476/46
6,383,112 B1 * 5/2002 Itoh et al. ..................... 476/40

FOREIGN PATENT DOCUMENTS

| JP | 1-203759 | * | 8/1989 |
| JP | 4-312213 | * | 11/1992 |
| JP | 10-196668 | * | 7/1998 |
| JP | 11-132303 |  | 5/1999 |
| JP | 11-182644 |  | 7/1999 |

* cited by examiner

*Primary Examiner*—William C. Joyce
(74) *Attorney, Agent, or Firm*—Sughrue Mion, PLLC

(57) ABSTRACT

The present toroidal-type continuously variable transmission comprises an oil passage formed in an input shaft so as to extend in the axial direction of the input shaft, a plurality of ball spline grooves formed in the outer peripheral surface of the input shaft so as to be spaced from one another at a given interval in the peripheral direction of the input shaft, a plurality of oil grooves not only for connecting together the ball spline grooves but also for guiding lubricating oil along the outer peripheral surface of the input shaft, and two oil holes 1a formed in the input shaft 1 for allowing the oil grooves and oil passage to communicate with each other.

11 Claims, 5 Drawing Sheets

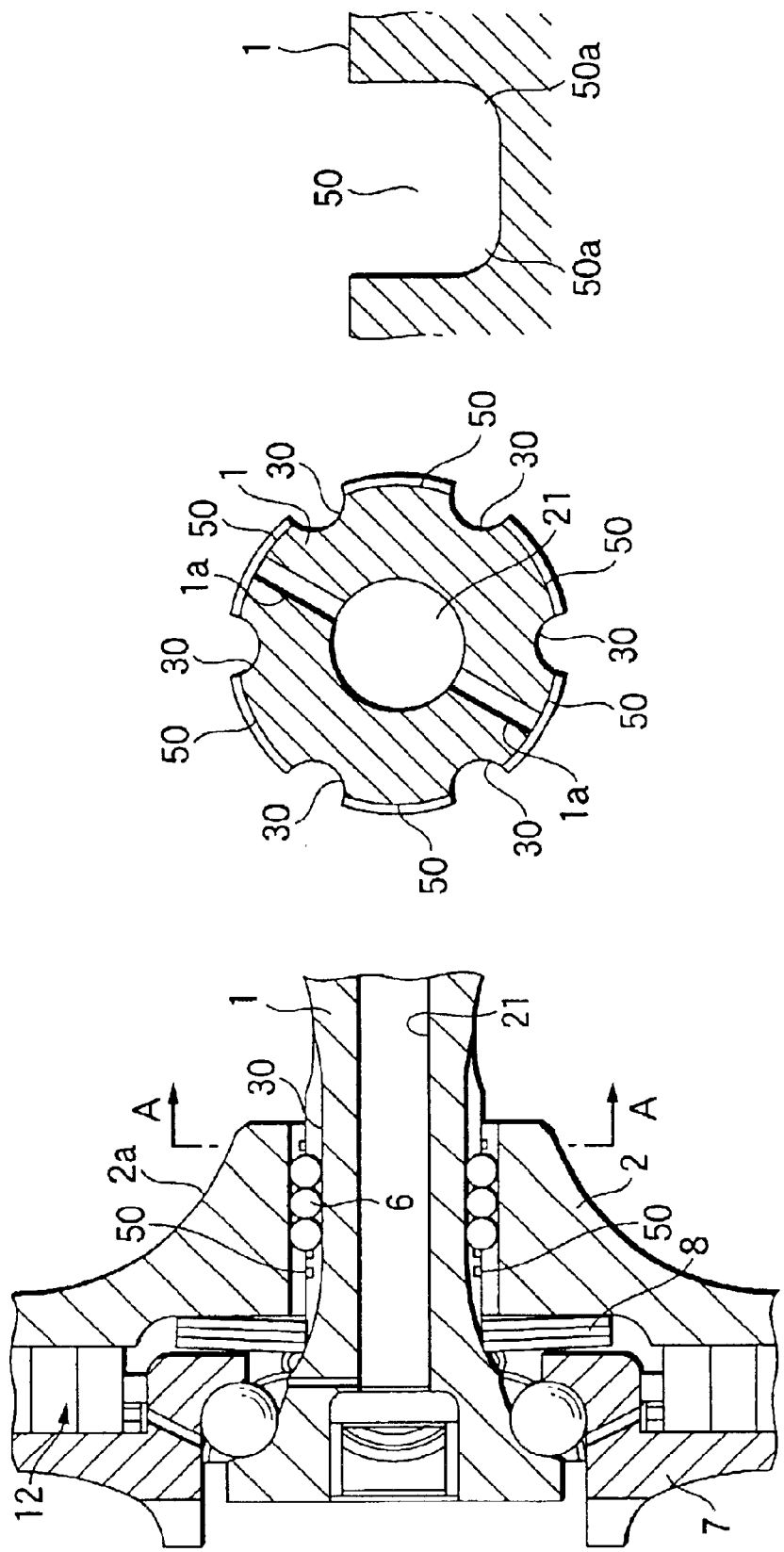

PRIOR ART

TOROIDAL-TYPE CONTINUOUSLY VARIABLE TRANSMISSION

BACKGROUND OF THE INVENTION

The present invention relates to a toroidal-type continuously variable transmission which can be used as a transmission for a vehicle.

Now, FIG. 3 shows an example of a conventional toroidal-type continuously variable transmission which can be used as a transmission for a vehicle. This is a toroidal-type continuously variable transmission of a so-called double cavity type which is designed for high torque. In this toroidal-type continuously variable transmission, two input side disks 2, 2 and two output side disks 3, 3 are mounted on the outer periphery of an input shaft 1 in such a manner that they are concentric with and opposed to each other. Also, an output gear 4 is rotatably supported on the outer periphery of the middle portion of the input shaft 1. The two output side disks 3 and 3 are respectively connected by spline engagement to cylindrical-shaped flange portions 4a and 4a formed in the central portion of the output gear 4.

By the way, the input shaft 1 can be driven or rotated by a drive shaft 22 through a pressing device 12 of a loading cam type interposed between the input side disk 2 situated on the left side in FIG. 3 and a cam plate 7. Also, the output gear 4 is supported within a housing 14 through a partition wall 13 which is composed of two members connected together, whereby the output gear 4 can be rotated about the axis O of the input shaft 1 but is prevented from shifting in the axis O direction.

The output side disks 3 and 3 are supported in such a manner that they can be rotated about the axis O of the input shaft 1 by their respective needle roller bearings 5 and 5 interposed between the input shaft 1 and disks 3, 3. On the other hand, the input side disks 2 and 2 are supported on the two end portions of the input shaft 1 through their respective ball splines 6 and 6 in such a manner that they can be rotated together with the input shaft 1. Also, as shown in FIG. 4 as well, power rollers 11 are rotatably held by and between the inner surfaces (concave surfaces) 2a, 2a of the respective input side disks 2, 2 and the inner surfaces (concave surfaces) 3a, 3a of the respective output side disks 3, 3.

Between the input side disk 2 situated on the left side in FIG. 3 and cam plate 7, there is interposed a first countersunk plate spring 8. Between the input side disk 2 situated on the right side in FIG. 3 and loading nut 9, there is interposed a second countersunk plate spring 10. These countersunk plate springs 8 and 10 apply pressing forces to the mutual contact portions between the concave surfaces 2a, 2a, 3a, 3a of the respective disks 2, 2, 3, 3 and the peripheral surfaces 11a, 11a (see FIG. 4) of the power rollers 11, 11.

Therefore, in the continuously variable transmission having the above structure, in case where a rotational force is input into the input shaft 1 from the drive shaft 22, the two input side disks 2 and 2 are rotated integrally with the input shaft 1, and the rotational movements of the input side disks 2 and 2 are transmitted by the power rollers 11 and 11 to the output side disks 3 and 3 at a given transmission ratio. Also, the rotational movements of the output side disks 3 and 3 are transmitted from the output gear 4 to an output shaft 17 through a transmission gear 15 and a transmission shaft 16.

By the way, in the thus structured continuously variable transmission, in order to maintain the smooth sliding movements of the input side disk 2 and input shaft 1, lubricating oil is supplied into a plurality of ball spline grooves 30 formed in the outer periphery of the input shaft 1. Generally, this lubricating oil is allowed to flow from an oil source through oil passages 20, 21 respectively formed in the drive shaft 22 and input shaft 1 and is supplied to the bottom portions of the ball spline grooves 30 through oil holes 1a formed in the input shaft 1 (see JP-A-11-182644).

Specifically, as shown in FIGS. 5A and 5B as well, in the center portion of the drive shaft 22, there is formed the oil passage 20 so as to extend along the axial direction thereof; and, in the center portion of the input shaft 1 as well, there is formed the oil passage 21 which extends along the axial direction thereof so as to be able to communicate with the oil passage 20. Also, in the two end portions of the input shaft 1 in which the ball spline grooves 30 are formed, there are formed a plurality of oil holes 1a which extend along the diameter direction of the input shaft 1 so as to allow the oil passage 21 and the plurality of ball spline grooves 30 to communicate with each other (see FIG. 5B). Therefore, when the input shaft 1 is in rotation, due to the centrifugal force of the rotational movement of the input shaft 1, the lubricating oil existing within the oil passage 21 is allowed to flow through the oil holes 1a to the ball spline grooves 30, thereby being able to secure a given level of lubrication between the input shaft 1 and input side disk 2 with the ball splines 6 interposed between them.

However, in the conventional lubricating oil supply structure in which, in the input shaft 1, there are formed the oil holes 1a for connecting the oil passage 21 directly to the ball spline grooves 30, and the lubricating oil is supplied through these oil holes 1a to the ball spline grooves 30 directly from the oil passage 21, there are still found several problems as follows.

Firstly, since a plurality of ball spline grooves 30 are formed in the outer periphery of the input shaft 1 at given intervals in the peripheral direction of the input shaft 1, the same number of oil holes 1a as the ball spline grooves 30 must be formed along the diameter direction of the input shaft 1 in order to be able to connect together the ball spline grooves 30 and the oil passage 21 of the input shaft 1. It takes long time to process the input shaft 1 and thus the manufacturing cost of the input shaft 1 is increased. Also, due to formation of a large number of holes in the input shaft 1, the yield strength of the input shaft 1 is lowered.

Secondly, when the oil passage 21 and ball spline grooves 30 are directly connected together through the oil holes 1a, the oil holes 1a respectively must be formed so as to be in communication with the bottom portions of their associated ball spline grooves 30 with accuracy. That is, the oil holes 1a must be formed in such a manner that they are matched in position to the ball spline grooves 30 with high accuracy. However, in case where such high-accuracy working operation is enforced on the oil holes 1a with respect to all of the ball spline grooves 30, there is a possibility that the working time of the input shaft 1 can be long and thus the manufacturing cost of the input shaft 1 can also be high.

SUMMARY OF THE INVENTION

The present invention aims at eliminating the drawbacks found in the above-mentioned conventional toroidal-type continuously variable transmission. Accordingly, it is an object of the present invention to provide a toroidal-type continuously variable transmission which, while employing a structure easy to process the input shaft without lowering the yield strength of the input shaft, is capable of supplying the lubricating oil to the ball spline grooves and also can be manufactured at a low cost.

In attaining the above object, according to a first aspect of the present invention, there is provided a toroidal-type continuously variable transmission, comprising: an input shaft into which a rotational force is input and including an oil passage formed in a center portion thereof so as to extend along an axial direction thereof; an input side disk rotating integrally with the input shaft; an output side disk disposed concentric with and opposed to the input side disk; a ball spline for supporting the input side disk disposed on the outer peripheral surface of the input shaft, the ball spline including a plurality of ball spline grooves formed in the outer peripheral surface thereof so as to be spaced from one another at a given interval in the peripheral direction thereof; and a plurality of oil grooves for connecting together the ball spline grooves, wherein the input shaft includes an oil hole for allowing the oil grooves and the oil passage to communicate with each other.

According to a second aspect of the present invention, there is provided a toroidal-type continuously variable transmission, comprising: an input shaft into which a rotational force is input; an input side disk rotating integrally with the input shaft; an output side disk disposed concentric with and opposed to the input side disk; and a ball spline for supporting the input side disk disposed on the outer peripheral surface of the input shaft; wherein the input shaft includes an oil passage formed in a center portion thereof so as to extend along an axial direction thereof, a plurality of ball spline grooves formed in the outer peripheral surface thereof so as to be spaced from one another at a given interval in the peripheral direction thereof, a plurality of oil grooves formed in the outer peripheral surface thereof respectively for connecting together the two mutually adjoining ones of the ball spline grooves, and an oil hole for allowing the oil grooves and the oil passage to communicate with each other.

According to a third aspect of the present invention, there is provided a toroidal-type continuously variable transmission as set forth in the first and second aspects, wherein the oil hole formed in the input shaft is composed of two oil holes, and the two oil holes respectively extend along the diameter direction of the input shaft toward their respective ones of oil grooves and are formed so as to opposed to and spaced from each other at an angular interval of 180° in the peripheral direction of the input shaft.

According to a fourth aspect of the present invention, there is provided that a toroidal-type continuously variable transmission as set forth in the first and second aspects, wherein each of the oil grooves is formed such that the bottom edge portion thereof has a given value of curvature.

According to a fifth aspect of the present invention, a toroidal-type continuously variable transmission, comprising: an input shaft into which a rotational force is input; an input side disk rotating integrally with the input shaft; an output side disk disposed concentric with and opposed to the input side disk; and a ball spline for supporting the input side disk disposed on the outer peripheral surface of the input shaft; wherein the input shaft includes an oil passage formed in a center portion thereof so as to extend along an axial direction thereof, and a plurality of ball spline grooves formed in the outer peripheral surface thereof so as to be spaced from one another at a given interval in the peripheral direction thereof; the input side disk includes a plurality of ball spline grooves formed in the inner peripheral surface thereof and a plurality of oil grooves formed in the inner peripheral surface thereof respectively for connecting together the two mutually adjoining ones of the ball spline grooves; and the input shaft further includes an oil hole for allowing the oil grooves and the oil passage to communicate with each other.

According to a sixth aspect of the present invention, a toroidal-type continuously variable transmission as set forth in the fifth aspect, wherein the oil hole formed in the input shaft includes three oil holes formed spaced from one another at an angular interval of 120° in the peripheral direction of the input shaft.

According to the present invention, since there are provided the oil grooves which not only connect together the ball spline grooves but also guide the lubricating oil along the outer peripheral surface of the input shaft, there is eliminated the need to form the same number of oil holes, which are used to connect together the ball spline grooves and oil passage, as the number of ball spline grooves. That is, because there is eliminated the need to connect the oil holes to all of the ball spline grooves, the number of oil holes can be reduced when compared with the conventional toroidal-type continuously variable transmission. As a result of this, when compared with the conventional toroidal-type continuously variable transmission, not only the working time can be shortened and the manufacturing cost can be reduced but also, since there is eliminated the need to work or form a large number of holes in the input shaft, the yield strength of the input shaft can be enhanced.

Also, according to the present invention, the oil grooves are formed in the outer peripheral surface of the input shaft and respectively connect together the mutually adjoining ones of the ball spline grooves, which makes it possible to enhance the working efficiency of the present toroidal-type continuously variable transmission.

Further, according to the present invention, the oil grooves may also be formed in the inner peripheral surface of the input side disk so as to connect together the mutually adjoining ones of the ball spline grooves. In this case, since the oil grooves are formed in the input side disk, the quantities of the operations for cutting the input shaft and for forming the holes in the input shaft can be reduced, which can enhance the yield strength of the input shaft still further.

Still further, according to the present invention, because the oil holes are formed so as to be in connection with the oil grooves, there is eliminated the need for execution of high-accuracy working to match the oil holes in position to the ball spline grooves, which can shorten the working time greatly and thus can reduce the manufacturing cost.

BRIEF DESCRIPTION OF THE DRAWINGS

FIG. 1A is a section view of the main portions of a toroidal-type continuously variable transmission according to a first embodiment of the present invention, FIG. 1B is a section view taken along the line A—A shown in FIG. 1A, and FIG. 1C is an enlarged section view of one of oil grooves shown in FIG. 1B;

DETAILED DESCRIPTION OF THE PREFERRED EMBODIMENTS

Figure 2A:
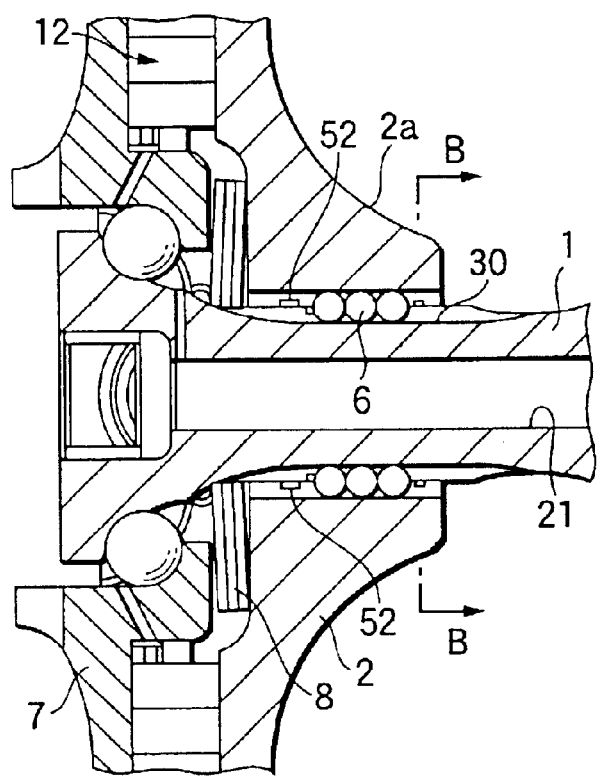
FIG. 2A is a section view of the main portions of a toroidal-type continuously variable transmission according to a second embodiment of the present invention.

Now, description will be given below of the preferred embodiments of a toroidal-type continuously variable transmission according to the present invention with reference to the accompanying drawings. By the way, the characteristic element of the present invention lies on an improvement in a lubrication structure for supplying lubricating oil to spline grooves and the remaining structures and operation of the present invention are similar to those of the previously described conventional toroidal-type continuously variable transmission. Accordingly, in the following description, description will be given only of the characteristic portions of the present invention. The remaining portions of the present invention are given the same designations as in FIGS. 3 to 5B and thus the detailed description thereof is omitted.

Now, FIGS. 1A to 1C show a first embodiment of the present invention. As shown in FIGS. 1A to 1C, a toroidal-type continuously variable transmission of a double cavity type for high torque according to the present embodiment, in order to maintain the smooth rotation of an input side disk 2 and an input shaft 1, has an improved lubricating oil supply structure for supplying lubricating oil to a plurality of ball spline grooves 30 (that is, ball spline connecting portions) formed in the outer periphery of the end portions of the input shaft 1. Lubricating oil supplied from an oil supply source (not shown) is allowed to flow through an oil passage 20 (see FIG. 3) formed in a drive shaft 22 and an oil passage 21 formed in the input shaft 1, and can be then supplied to the ball spline grooves 30 through two common oil holes 1a formed in the input shaft 1 and oil grooves 50 also formed in the input shaft 1.

Specifically, in the center portion of the input shaft 1, there is formed the oil passage 21 which extends along the axial direction of the input shaft 1 so as to communicate with the oil passage 20 (see FIG. 3) of the drive shaft 22. Also, in the outer periphery of the input shaft 1, there are formed a plurality of ball spline grooves 30 at given intervals in the peripheral direction of the input shaft 1. Further, in the outer peripheral surface of the input shaft 1, between the respective ball spline grooves 30, there are formed the oil grooves 50 which connect together the mutually adjoining ones of the ball spline grooves 30. And, in the end portion of the input shaft 1 where ball splines 6 are situated, there are formed the two oil holes 1a which extend along the diameter direction of the input shaft 1 and also allow the oil passage 21 to communicate with two specific ones of the oil grooves 50 (see FIG. 1B). In the present embodiment, the two oil holes 1a respectively extend toward the two oil grooves 50 which are opposed to each other in the peripheral direction of the input shaft 1 at an angular interval of 180° (that is, in the input shaft 1, there are formed the two oil holes 1a at an angular interval of 180° in the peripheral direction thereof).

By the way, in order to avoid concentration of stresses, the bottom edge portion 50a of each of the oil grooves 50 is formed such that it has a given value of curvature (see FIG. 1C).

According to the thus arranged lubricating oil supply structure, the lubricating oil, which is supplied from an oil supply source (not shown), flows through the oil passage 20 formed in the drive shaft 22 and the oil passage 21 formed in the input shaft 1 and also, due to the centrifugal force caused by the rotation of the input shaft 1, the lubricating oil flows from within the oil passage 21 into the two specific oil grooves 50 through the two oil holes 1a. And, the lubricating oil, which has flown into these two oil grooves 50, then flows into the ball spline grooves 30 adjoining these two oil grooves and, after then, it further flows into another adjoining ball spline grooves 30 through another oil grooves 50. That is, in this manner, the lubricating oil finally reaches all of the ball spline grooves 30. This can secure a given level of lubrication in the input shaft 1 and input side disk 2 with the ball splines 6 interposed between them.

As described above, in a toroidal-type continuously variable transmission according to the present embodiment, since there are provided the oil grooves 50 which not only connect together the ball spline grooves 30 but also guide the lubricating oil along the outer peripheral surface of the input shaft 1, there is eliminated the need to form the same number of oil holes 1a, which are used to connect together the ball spline grooves 30 and oil passage 21, as the number of ball spline grooves 30. That is, because there is eliminated the need to connect the oil holes 1a to all of the ball spline grooves 30, the number of the oil holes 1a can be reduced when compared with the conventional toroidal-type continuously variable transmission. As a result of this, when compared with the conventional toroidal-type continuously variable transmission, not only the working time can be shortened and the manufacturing cost can be reduced but also, since there is eliminated the need to work the input shaft 1 or form a large number of holes in the input shaft 1, the yield strength of the input shaft 1 can be enhanced.

Especially, according to the present embodiment, not only the number of oil holes 1a can be reduced but also there is eliminated the high-accuracy working in which the oil holes 1a are matched in position to the ball spline grooves 30, because the oil holes 1a are connected not to the ball spline grooves 30 but to the oil grooves 50. Simply to reduce the number of the oil holes 1a can provide an effect that the high-accuracy working operation need not be enforced on the oil holes 1a with respect to all of the ball spline grooves 30 (that is, the number of high-accuracy working steps can be reduced). Further, as in the present embodiment, in case where the oil holes 1a are so formed as to be connected to the oil grooves 50, there can be eliminated the high-accuracy working operation, which can shorten the working time greatly and thus can reduce the manufacturing cost accordingly.

Also, according to the present embodiment, since the oil grooves 50 are formed in the outer peripheral surface of the input shaft 1 and connect together the mutually adjoining ball spline grooves 30, there can be provided very high working efficiency.

Figure 2B:
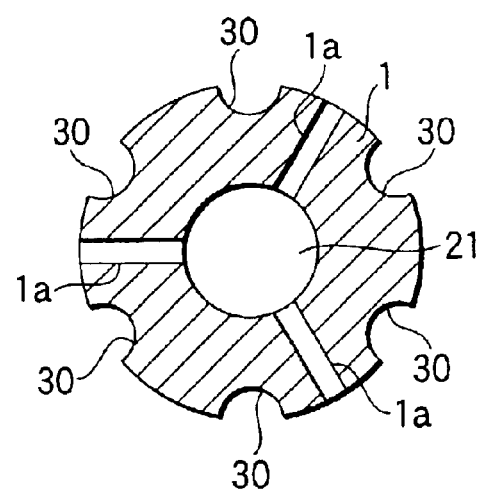
FIG. 2B is a section view taken along the line B—B shown in FIG. 2A.
Figure 3:
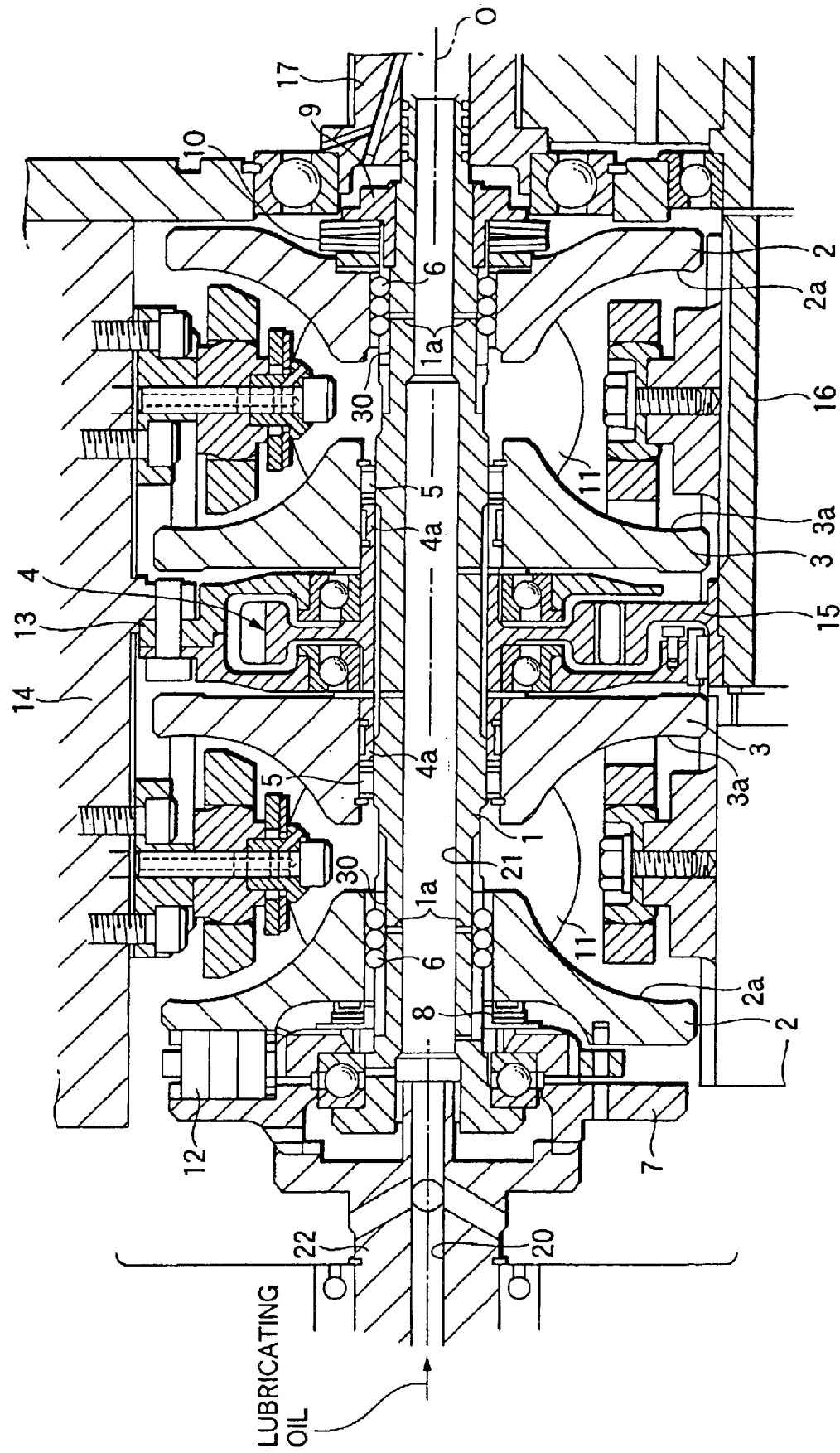
FIG. 3 is a section view of a conventional toroidal-type continuously variable transmission.
Figure 4:
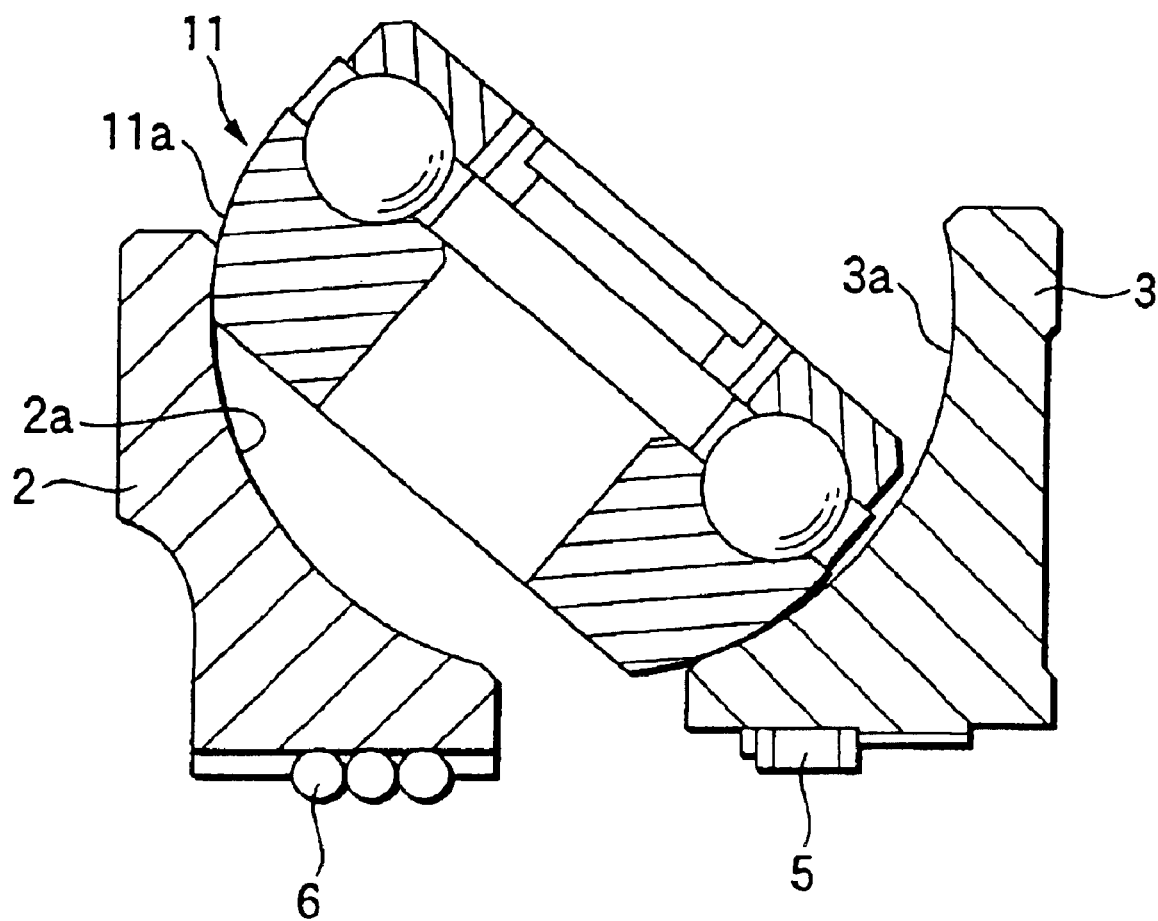
FIG. 4 is a section view of a power roller portion interposed between an input side disk and an output side disk shown in FIG. 3; and, FIG. 5A is an enlarged section view of the main portion of the conventional toroidal-type continuously variable transmission shown in FIG. 3.
Figure 5A:
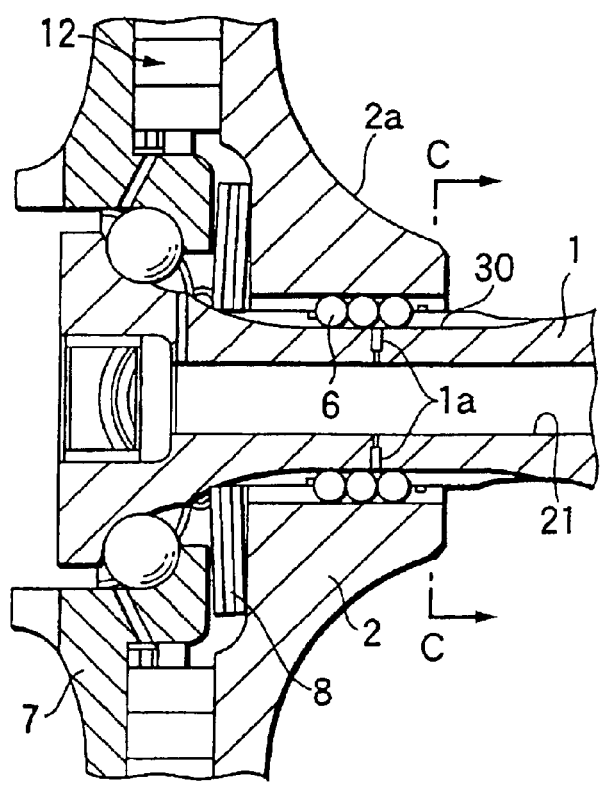
FIG. 5B is a section view taken along the line C—C shown in FIG. 5A.
Figure 5B:
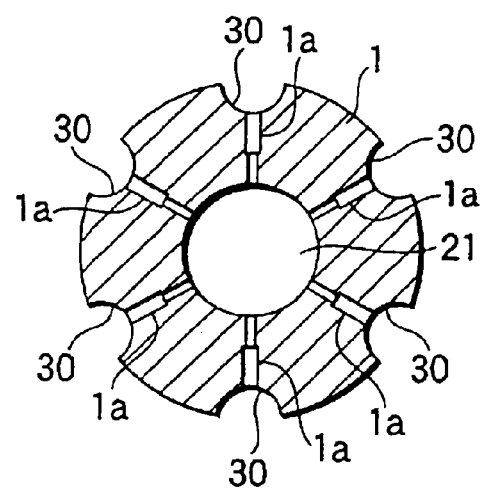

Now, FIGS. 2A and 2B show a second embodiment of the present invention. By the way, the present embodiment is a modification of the previously described first embodiment. Therefore, in the following description, the composing parts of the present embodiments having the same structures as the first embodiment are given the same designations and thus the description thereof is omitted.

As shown in FIGS. 2A and 2B, in the present embodiment, the oil grooves 52, which are used to connect together the ball spline grooves 30 and guide the lubricating oil along the outer peripheral surface of the input shaft 1, are formed in the inner peripheral surface of the input side disk 2 (see FIG. 2A). In this case, the oil grooves 52 connect together the ball spline grooves 30 that adjoin each other. Also, with the movements of the oil grooves 52 along the axial direction of the input side disk 2 taken into account, the oil grooves 52 are formed long in the axial direction of the input shaft 1. That is, the width of each of the oil groove 52 is set such that, even in case where the input side disk 2 moves up to the maximum position in the axial direction thereof, the oil groove 52 is able to connect together the ball spline grooves 30 positively.

Also, the oil holes 1a formed in the input shaft 1 connect the oil passage 21 to the oil grooves 52. In this case, there are formed the oil holes 1a three in number, while the three oil holes 1a are spaced from one another at an angular interval of 120° in the peripheral direction of the input shaft 1. By the way, although not shown, similarly to the first embodiment, for avoidance of stress concentration, the bottom edge portion of each of the oil grooves 52 is formed such that it has a given value of curvature.

As described above, in the case of a toroidal-type continuously variable transmission according to the present embodiment as well, because it has a similar structure to the first embodiment, there can be provided similar operation effects to the first embodiment. At the same time, since the oil grooves 52 are formed in the input side disk 2, the quantities of the operations for working or cutting the input shaft 1 and for forming holes in the input shaft 1 can be reduced, which can enhance the yield strength of the input shaft 1 still further.

By the way, the present invention is not limited to the above-described embodiments but, of course, various changes and modifications are possible without departing from the subject matter of the present invention. For example, in the above-described respective embodiments, the number of the oil holes 1a is two or three; however, the number of the oil holes 1a is not limited to this, but it may also be one. Also, the forming structure of the oil grooves 50, 52 for connecting together the ball spline grooves 30 is not limited to the above-described embodiments. There can also be employed another structure in which the oil grooves are not used to connect together the mutually adjoining ball spline grooves 30, provided that the structure allows the lubricating oil to spread over to all of the ball spline grooves 30 through the oil grooves. Also, the oil holes 1a may also be formed so as to reach not the oil grooves 50, 52 but the ball spline grooves 30. Further, it goes without saying that the present invention can apply not only to a toroidal-type continuously variable transmission of a double cavity type but also to a toroidal-type continuously variable transmission of a single cavity type.

As has been described heretofore, according to the present invention, the number of the oil holes for connecting the ball spline grooves to the oil passage can be reduced greatly when compared with the conventional toroidal-type continuously variable transmission. Thanks to this, the working time can be shortened and the manufacturing cost can be reduced. At the same time, since there is eliminated the need to open up a large number of holes in the input shaft, the yield strength of the input shaft can be enhanced.

Also, according to the present invention, the working efficiency can be enhanced greatly.

Further, according to the present invention, since the oil grooves are formed in the input side disk, the quantities of the operations for cutting the input shaft and for forming the holes in the input shaft can be reduced, which can enhance the yield strength of the input shaft still further.

Moreover, according to the present invention, because the oil holes are formed so as to be in connection with the oil grooves, there is eliminated the need for execution of the high-accuracy working operation to match the oil holes in position to the ball spline grooves, which can shorten the working time greatly and thus can reduce the manufacturing cost.

What is claimed is:

1. A toroidal-type continuously variable transmission, comprising:
   an input shaft into which a rotational force is input and including an oil passage formed in a center portion thereof so as to extend along an axial direction thereof;
   an input side disk rotating integrally with the input shaft;
   an output side disk disposed concentric with and opposed to the input side disk;
   a ball spline for supporting the input side disk disposed on the outer peripheral surface of the input shaft, the ball spline including a plurality of ball spline grooves formed in the outer peripheral surface thereof so as to be spaced from one another at a given interval in the peripheral direction thereof; and
   a plurality of oil grooves for connecting together the ball spline grooves,
   wherein the input shaft includes an oil hole for allowing the oil grooves and the oil passage to communicate with each other.

2. The toroidal-type continuously variable transmission as set forth in claim 1, wherein the oil hole formed in the input shaft includes two oil holes, and the two oil holes respectively extend along the diameter direction of the input shaft toward their respective ones of the oil grooves and are formed so as to be opposed to and spaced from each other at an angular interval of 180° in the peripheral direction of the input shaft.

3. The toroidal-type continuously variable transmission as set forth in claim 1, wherein each of the oil grooves is formed such that the bottom edge portion thereof has a given value of curvature.

4. The toroidal-type continuously variable transmission as set forth in claim 1, wherein the oil grooves are disposed around the whole circumferential surface of the input shaft.

5. A toroidal-type continuously variable transmission, comprising:
   an input shaft into which a rotational force is input;
   an input side disk rotating integrally with the input shaft;
   an output side disk disposed concentric with and opposed to the input side disk; and
   a ball spline for supporting the input side disk disposed on the outer peripheral surface of the input shaft;
   wherein the input shaft includes an oil passage formed in a center portion thereof so as to extend along an axial direction thereof, a plurality of ball spline grooves formed in the outer peripheral surface thereof so as to be spaced from one another at a given interval in the peripheral direction thereof, a plurality of oil grooves formed in the outer peripheral surface thereof respectively for connecting together the two mutually adjoining ones of the ball spline grooves, and an oil hole for allowing the oil grooves and the oil passage to communicate with each other.

6. The toroidal-type continuously variable transmission as set forth in claim 5, wherein the oil hole formed in the input shaft is composed of two oil holes, and the two oil holes respectively extend along the diameter direction of the input shaft toward their respective ones of oil grooves and are formed so as to opposed to and spaced from each other at an angular interval of 180° in the peripheral direction of the input shaft.

7. The toroidal-type continuously variable transmission as set forth in claim 5, wherein each of the oil grooves is formed such that the bottom edge portion thereof has a given value of curvature.

8. The toroidal-type continuously variable transmission as set forth in claim 5, wherein the oil grooves are disposed around the whole circumferential surface of the input shaft.

9. A toroidal-type continuously variable transmission, comprising:

an input shaft into which a rotational force is input;

an input side disk rotating integrally with the input shaft;

an output side disk disposed concentric with and opposed to the input side disk; and a ball spline for supporting the input side disk disposed on the outer peripheral surface of the input shaft;

wherein the input shaft includes an oil passage formed in a center portion thereof so as to extend along an axial direction thereof, and a plurality of ball spline grooves formed in the outer peripheral surface thereof so as to be spaced from one another at a given interval in the peripheral direction thereof;

the input side disk includes a plurality of ball spline grooves formed in the inner peripheral surface thereof and a plurality of oil grooves formed in the inner peripheral surface thereof respectively for connecting together the two mutually adjoining ones of the ball spline grooves; and the input shaft further includes an oil hole for allowing the oil grooves and the oil passage to communicate with each other.

10. The toroidal-type continuously variable transmission as set forth in claim 9, wherein the oil hole formed in the input shaft includes three oil holes formed spaced from one another at an angular interval of 120° in the peripheral direction of the input shaft.

11. The toroidal-type continuously variable transmission as set forth in claim 9, wherein the oil grooves are disposed around the whole circumferential surface of the input disk.

* * * * *